Sept. 7, 1937.  M. P. HOLMES  2,091,985
MINING MACHINE TRANSMISSION MECHANISM
Filed Nov. 21, 1933  7 Sheets-Sheet 2

Inventor:
Morris P. Holmes.
by Louis A. Maxon.
Att'y.

Sept. 7, 1937. M. P. HOLMES 2,091,985
MINING MACHINE TRANSMISSION MECHANISM
Filed Nov. 21, 1933 7 Sheets-Sheet 4

Inventor:
Morris P. Holmes

Sept. 7, 1937.  M. P. HOLMES  2,091,985
MINING MACHINE TRANSMISSION MECHANISM
Filed Nov. 21, 1933   7 Sheets-Sheet 5

Inventor:
Morris P. Holmes.
by
Att'y.

Sept. 7, 1937.　　　　M. P. HOLMES　　　　2,091,985
MINING MACHINE TRANSMISSION MECHANISM
Filed Nov. 21, 1933　　　7 Sheets-Sheet 7

Inventor:
Morris P. Holmes.
by Louis A. Maxson
Att'y.

Patented Sept. 7, 1937

2,091,985

UNITED STATES PATENT OFFICE 2,091,985

MINING MACHINE TRANSMISSION MECHANISM

Morris P. Holmes, Claremont, N. H., assignor to Sullivan Machinery Company, a corporation of Massachusetts Application November 21, 1933, Serial No. 699,024

20 Claims. (Cl. 74—125.5)

This invention relates to mining machines, and more particularly, but not exclusively, to improvements in coal mining machines of the flexibly fed, floor cutter type.

An object of this invention is to provide an improved coal mining machine. Another object is to provide an improved coal mining machine of the flexibly fed, floor cutter type. A further object is to provide in a mining machine of the above character an improved flexible feeding mechanism. Still another object is to provide an improved flexible feeding mechanism wherein a plurality of relatively rotatable cable winding drums are employed for feeding and guiding the machine, and improved means for driving and controlling the drums. Yet another object is to provide an improved variable speed driving means for the cable winding drums, for rotating the latter through a wide range of feeding speeds between zero and a predetermined maximum. Another object is to provide an improved flexible feeding mechanism for a mining machine of the room-and-pillar or so-called shortwall type. These and other objects and advantages of the invention will, however, hereinafter more fully appear.

In the accompanying drawings there are shown, for purposes of illustration, three forms which the invention may assume in practice.

In these drawings,—

In the illustrative embodiment of the invention shown in Figs. 1 to 9, inclusive, there is shown a mining machine of the flexibly fed, room-and-pillar, standard floor cutter type, generally comprising a machine frame 1 having a plane bottom surface 2 for supporting the machine for universal sliding movement over the mine floor. The machine frame generally comprises a bed frame section 3 having supported thereon a front motor section 4 and a rear feed frame section 5, the motor section being arranged on the bed frame in advance of the feed frame section. Extending longitudinally through the bed frame 3 is a cutter chamber 6, and secured within the bed frame and projecting within this chamber and extending forwardly from the machine frame from beneath the front motor section 4, is a horizontal plane cutter bar 7 having mounted on its margin for circulation thereabout a cutter bit carrying cutter chain 8. The cutter chain extends longitudinally through the bed frame chamber 6 and serves, upon circulation thereof, to carry the cuttings from the kerf back through the bottom of the bed frame to discharge at the rear end of the machine, as is usual in mining machines of the standard room-and-pillar type. Arranged on transversely extending alined axes on the feed frame 5 at opposite sides of the machine, are relatively rotatable feeding and controlling haulage members, herein cable winding drums 9 and 10, respectively cooperating with flexible draft members, herein feeding and controlling cables 11 and 12. As is usual in machines of the room-and-pillar type, there are arranged at the opposite front corners of the machine frame suitable guide sheaves 14, 14, herein mounted on swing arms 15 pivotally mounted on horizontal axes to swing in a vertical direction, while arranged at the opposite sides of the machine, on alined axes parallel with the axes of the feeding and controlling drums and in advance of the latter, are vertical guide sheaves 16, 16. Also arranged in transverse planes beneath the feeding and controlling drums at the rear end of the machine are horizontal guide sheaves 17, 18, 19, and 20, herein disposed on vertical axes and in sets, two at each rear corner of the machine. The feeding and controlling cables 11 and 12 may be extended from the feeding and controlling drums, around the guide sheaves 14, 16, 17, 18, 19, and 20 in various manners, and in any preferred direction in manners well known to those skilled in the art.

Now referring to the improved driving means for the cutter chain 8, it will be noted that the motor frame section 4 has housed therein a horizontal motor, herein preferably of the reversible electric type, having its power shaft 20 extending longitudinally of the machine; and fixed to the rear end of this power shaft is a spur pinion 21 meshing with a spur gear 22 keyed to a horizontal, longitudinally extending drive shaft 23, suitably journaled within the feed frame 5. Journaled on a bearing sleeve 24 supported by the shaft 23 is a bevel pinion 25 meshing with a large horizontal bevel gear 26 arranged within a chamber 27 formed in the bed frame 3. The beveled pinion 25 is connectible to the shaft 23 for driving thereby, by means of a jaw clutch member 28 splined to the shaft. The hub 29 of the bevel gear 26 is journaled in a bearing carried by the bed casing and has secured thereto a vertical shaft 30, in turn journaled in a bearing carried by a step plate 31 secured to the bottom of the bed frame. Clutched to the bevel gear hub 29 and supported by the shaft 30 is a chain sprocket 32 which engages and drives the cutter chain 8 in the usual manner to effect circulation thereof about the margin of the cutter bar. This jaw clutch member 28 may be slid into and out of operative clutching position by means of a shipper yoke 33 having bearing supports fixed to oppositely extending, alined, horizontal operating rods 34, 34 suitably rotatably mounted at their outer ends within the sides of the feed frame. Fixed to one of these operating rods is a lever arm 35 connected by a rearwardly extending link 36 (see Fig. 7) to a lever arm 37 (see also Fig. 6) fixed to a horizontal rod 38 extending transversely of the machine and rotatably mounted at its ends within the side walls of the feed frame. Fixed to one end of this rod is an operating lever 39 having a plunger lock 40 for holding the clutch member in its connected and released positions. It will thus be seen that the cutter chain may be driven by the motor or remain idle, at will, during running of the motor.

Figure 1:
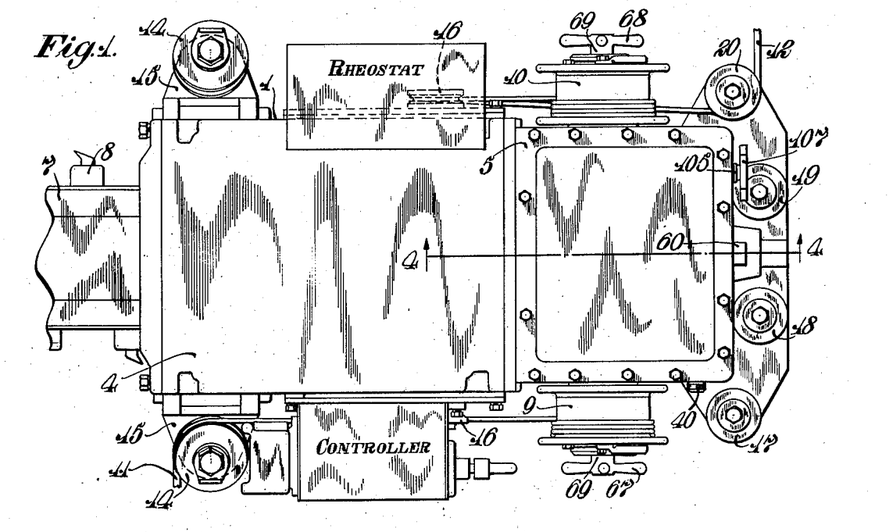
Fig. 1 is a plan view of one illustrative form of the improved coal mining machine.
Figure 2:
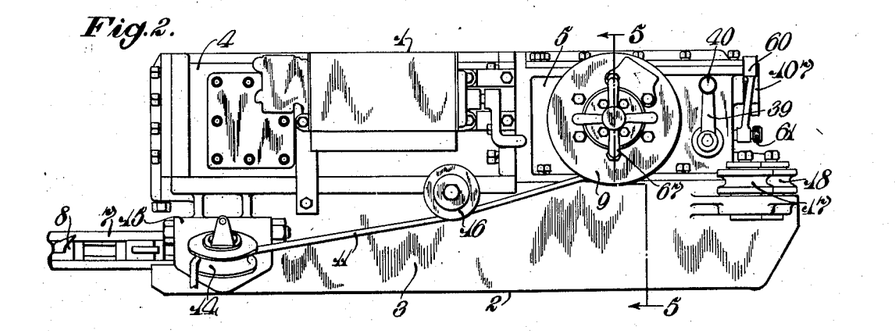
Fig. 2 is a side elevational view of the machine shown in Fig. 1.
Figure 3:
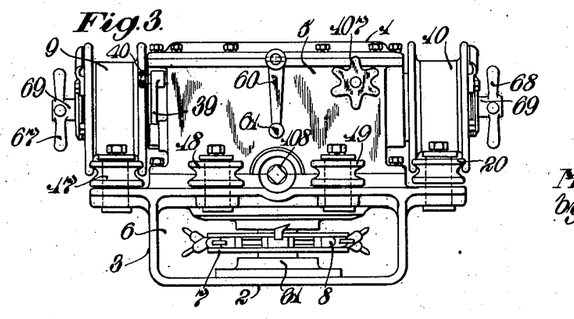
Fig. 3 is a rear end elevational view of the improved mining machine.
Figure 4:
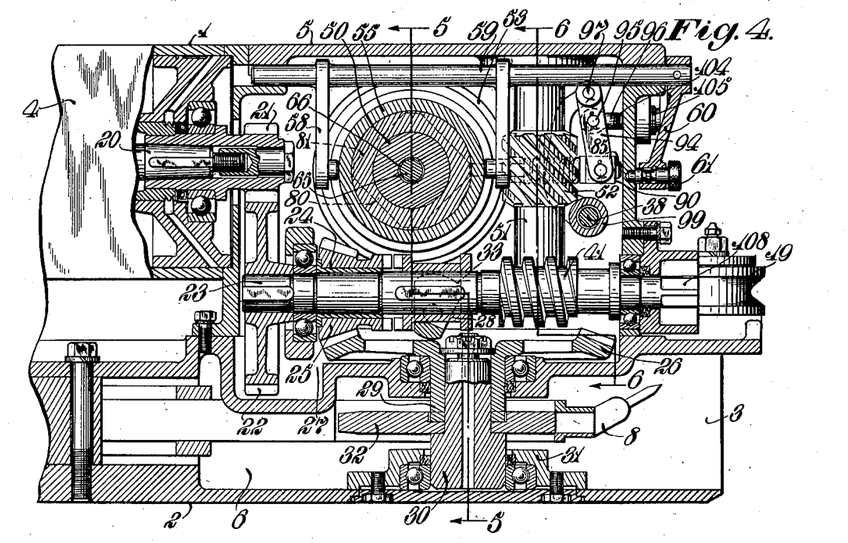
Fig. 4 is an enlarged, longitudinally extending, vertical sectional view taken substantially on line 4—4 of Fig. 1.
Figure 5:
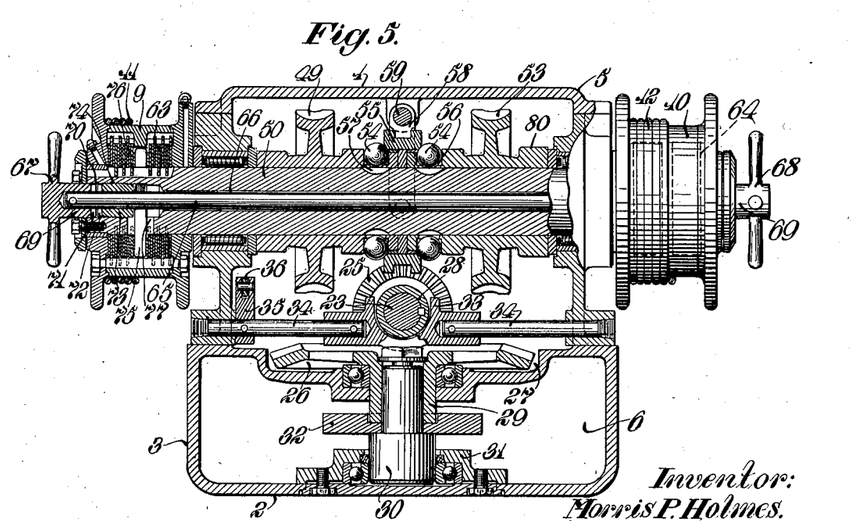
Fig. 5 is a transverse vertical sectional view taken substantially on line 5—5 of Figs. 2 and 4.
Figure 6:
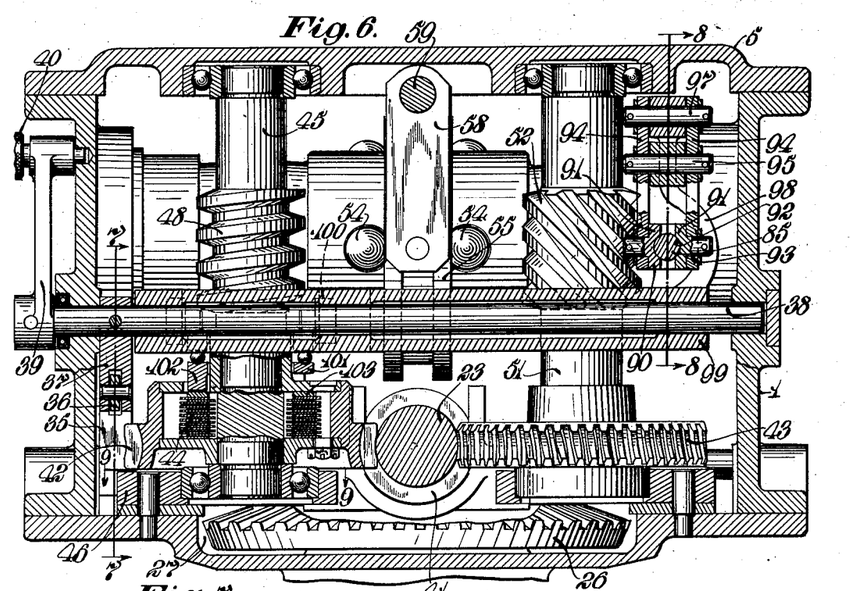
Fig. 6 is a transverse vertical sectional view taken substantially on line 6—6 of Fig. 4.
Figure 7:
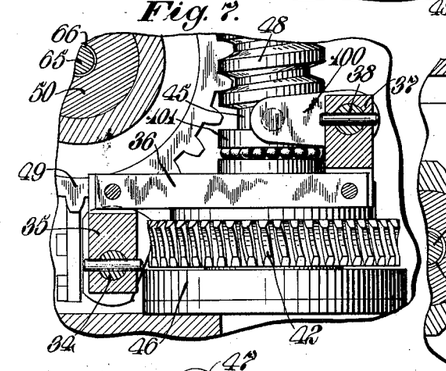
Fig. 7 is a detail vertical sectional view taken substantially on line 7—7 of Fig. 6.

Now referring to the improved feeding mechanism, and more particularly to the improved variable speed driving means for the cable drums 9 and 10, it will be noted that secured to and driven by the longitudinal shaft 23 is a worm 41 meshing at its opposite sides with and driving in opposite directions, horizontal worm wheels 42 and 43, herein arranged on parallel vertical axes at opposite sides of the feed frame in the manner shown in Fig. 6. The worm wheel 42 is connectible by a multiple disc clutch 44 to a vertical shaft 45 suitably journaled at its upper and lower ends within the feed frame. The lower bearing for the shaft 45 is supported by a detachable bearing bracket 46 held in position by dowel pins and secured to the frame by bolts 47, the bracket being secured at its left-hand end to the frame and projecting inwardly in the overhanging position shown. Fixed to the shaft 45 and driven thereby is a slow speed worm 48 meshing with a slow speed worm wheel 49 rotatably mounted on a horizontal drum drive shaft 50 arranged transversely of the feed frame and suitably journaled within bearings carried by the opposite side walls of the feed frame. The worm wheel 43 is fixed to a vertical shaft 51, similar to the shaft 45 and likewise journaled at its upper and lower ends within the feed frame. Fixed to the shaft 51 and driven thereby is a high speed worm 52 meshing with a high speed worm wheel 53 coaxial with the worm wheel 49 and likewise rotatably mounted on the shaft 50, as shown in Fig. 5. The vertical shafts 45 and 51 are arranged with their axes lying in a transverse vertical plane to the rear of the transverse shaft 50.

The low and high speed worm wheels 49 and 53 are connectible in driving relation with the shaft 50 to effect drive of the latter at either a low or a high speed, and the means for connecting these worm wheels to the shaft comprise locking plungers, herein in the form of balls 54, 54 controlled by a reciprocable shipper member 55 surrounding the shaft 50 and slidably supported by the adjacent ends of the worm wheel hubs. These locking plungers are guided within radial openings 56 formed in the hubs of the worm wheels, and are movable into interlocking engagement with locking recesses or grooves 57 formed in the shaft 50. The clutch member 55 is operated by a shipper yoke 58 formed on a longitudinally extending operating rod 59 rotatably mounted within the upper portion of the feed frame and having fixed thereto at its rear end an operating lever 60. This operating lever carries a plunger lock 61 for holding the clutch member 58 in its different positions. It will thus be seen that when the member 55 is shifted toward the left in Fig. 5 the right-hand locking plungers 54 are released from the locking grooves in the shaft 50, while the left-hand plungers 54 are slid inwardly within the locking grooves 57, thereby to connect positively the worm wheel 49 to the shaft 50. When the clutch member 55 is shifted toward the right in Fig. 5, the left-hand locking plungers are released while the worm wheel 53 is connected to the shaft by the right-hand locking plungers 54.

The drums 9 and 10 are journaled on the projecting ends of the shaft 50 at the opposite sides of the feed frame, and are connectible in driving relation with the shaft 50 by multiple disc clutches 63, 64, respectively. The operating means for these clutches comprise an actuating rod 65 extending axially through a central bore 66 in the shaft 50 and having fixed thereto at its opposite ends operating handles 67 and 68. Each of these handles is provided with a hub 69 arranged within an enlarged bore 70 formed in the shaft 50, and this hub is provided with clutch teeth 71 connectible with clutch teeth 72 formed on a clutch operating member 73 threaded at 74 within the shaft bore. The member 73 engages lever elements 75 interposed between sets of clutch discs and acting on a pressure plate 76 for each set, these levers projecting inwardly through apertures or slots 77 formed in the shaft 50 in a manner shown in Fig. 5. It will thus be seen that when the handle 67 is slid inwardly from the position shown in Fig. 5 it is clutched to the operating element 73, and upon rotation of the handle the element 73 is rotated, and due to its threaded connection with the shaft is moved axially inwardly, thereby swinging the levers 75 to effect spreading of the pressure plates 76, thereby to apply the clutch 63; and as a result, the drum 9 is connected in driving relation with the shaft 50. When the control rod 65 is slid in the opposite direction, the handle 67 is disconnected from its operating element 73, while the handle 68 is connected to its cooperating operating element, and upon rotation of the handle 68 the clutch 64 within the drum 10 is applied, connecting the drum 10 in driving relation with the shaft 50. It is therefore evident that the drums 9 and 10 may be separately or simultaneously connected in driving relation with the shaft 50, and may be driven by the shaft under the control of the disc operating member 55 for the locking plungers 54 at either a low or a high speed, and in the same direction at both speeds.

Figure 8:
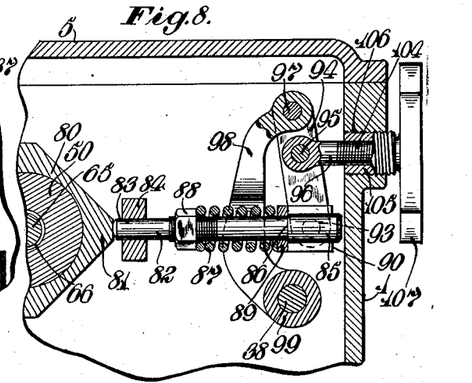
Fig. 8 is a detail vertical sectional view taken substantially on line 8—8 of Fig. 6.
Figure 9:
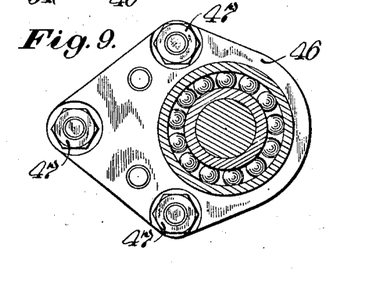
Fig. 9 is a detail horizontal sectional view taken substantially on line 9—9 of Fig. 6.

The improved operating mechanism for the low speed disc clutch 44 for effecting drive of the drum drive shaft 50 at variable speeds through the low speed worm gearing 48, 49 comprises, as shown most clearly in Fig. 8, a cam element 80 formed integral with the hub of the fast speed worm wheel and having a plurality, herein four, of cam projections 81; and cooperating with the cam surfaces on this cam element and arranged to the rear of the latter is a horizontal, longitudinally disposed plunger, herein in the form of a rod 82 guided within a bore 83 formed in a bracket member 84 secured to the feed frame. The rearward end of this plunger rod 82 is formed with a cylindrical enlargement 85 presenting a shoulder 86, and a coil spring 87 encircling the rod is compressed between an adjustable abutment, herein a nut 88, adjustably threaded on the rod 82, and a collar 89 slidably mounted on the rod and normally engaging the shoulder 86. The cylindrical enlargement 85 of the rod passes through and guides a trunnion device 90, herein comprising trunnion elements 91, 91 having concave recesses 92 slidably engaging the cylindrical sides of the enlargement 85 and pivotally connected at 93 to vertically swingable lever arms 94, 94. The trunnion device 90 is supported by the lever arms 94, and these lever arms are supported for pivotal movement on a horizontal pin 95 supported by an adjustable member 96, this adjustable member providing an adjustable fulcrum mounting for the lever arms. The ends of the lever arms opposite from the trunnion device are pivotally connected to a horizontal pin 97 carried by a lever 98 having an elongated sleeve-like hub 99 rotatably mounted on the transverse operating rod 38 of the cutter chain controlling clutch 28. The end of the sleeve-like hub 99 opposite from the lever 98 has secured thereto a clutch shipper yoke 100 engaging a ball bearing clutch operating member 101. This clutch operating member has projections 102 engageable with the pressure plate 103 of the disc clutch 44. In the present construction the adjustable member 96 is in the form of an eye-bolt having a threaded portion 104 threadedly engaged within a rotatable nut member 105, in turn threadedly connected at 106 within the rear end wall of the feed frame and having an operating handle 107. The member 104 and the nut member 105 are provided with right and left-hand threads respectively, and upon rotation of the handle 107 the member 96 is moved axially to vary the position of the fulcrum of the lever arms 94. It will thus be seen that when the parts are in the position shown in Fig. 8 and the cam element 80 is rotating, the cam projections 81 engaging the plunger rod 82 move the latter axially, increasing the tension of the spring 87 and, through the spring, collar 89 and trunnion device 90, effecting swinging of the lever arms 94, thereby to swing the lever 98 and, as a result, depressing the shipper yoke 100 to effect intermittent application of the friction clutch 44, the clutch being applied every time a cam projection acts to move the plunger rod 82 to the right, and the clutch being released each time the plunger rod engages a low point in the cam. By adjusting the handle 107, the position of the fulcrum of the lever arms 94 may be changed to vary the time interval of application of the friction clutch. By moving the lever fulcrum into its extreme inner position, the inner end of the plunger rod is at all times held against the surface of the cam element, thereby effecting constant application of the friction clutch, the spring 87 compressing as the cam projections engage and move the plunger rod. By moving the lever fulcrum to its extreme opposite position, the cam element may rotate while the friction clutch is at all times released, the plunger rod moving axially back and forth as the cam projections engage the same without applying the clutch. It will thus be seen that the low speed worm gearing 48, 49 may be driven through the disc clutch 44 at any desired low feeding speed between zero and a predetermined maximum low feeding speed, the worm gearing being driven intermittently through a wide range of speeds and continuously at a maximum low speed. It will also be evident that when the disc clutches within the cable drums 9, 10 are applied and the high speed worm wheel 53 is connected to the drum drive shaft 50 by the interlocking clutch device 54, 55, 57, the drums may be rotated in winding direction at a relatively high machine moving or haulage speed; while when the disc clutch 44 is applied and the low speed worm wheel 49 is connected to the shaft 50 by the interlocking clutch mechanism, the drums may be driven in winding direction at a relatively low feeding speed; and by varying the application of the disc clutch 44, the drums may be driven in winding direction at any desired feeding speed between zero and the maximum low feeding speed. The drums may be simultaneously connected to the drum drive shaft 50, or one or the other may be released therefrom, as desired; it also being possible to release both drums from the shaft. By moving the shipper member 55 in the intermediate or neutral position shown, both of the interlocking clutch mechanisms 54, 57 are released, thereby permitting the drum drive shaft 50 to remain stationary while the worm wheels 49, 53 both rotate.

The mining machine disclosed herein is adapted to be supported on a transport truck during transport of the machine about the mine, as is usual in room-and-pillar machines, and the wheels of the transport truck may be driven from the mining machine motor through the motor pinion 21, spur gear 22 and the longitudinal drive shaft 23, the rear end of this shaft being polygonally formed at 108 for engagement with the polygonal socket formed on the driving element of the truck.

In the form of the invention shown in Figs. 10 to 13, inclusive, the improved feeding mechanism is shown embodied in a mining machine of the flexibly fed, room-and-pillar, low-vein floor cutter type, herein comprising a low, compact machine frame 110 made up in three sections, i. e. a central motor section 111, a front cutter frame section 112, and a rear feed frame section 113, the motor section 111 being interposed between the cutter and feed frame sections. The motor 111 is supported in elevated position above the mine floor on a separate bed frame 114 secured to the cutter and feed frames. Secured within the front cutter frame section 112 and projecting forwardly therefrom is a horizontal plane cutter bar 115 having mounted on its margin for circulation thereabout a cutter bit carrying cutter chain 116. Arranged on alined transversely extending axes on the opposite sides of the feed frame 113 are feeding and controlling drums 117 and 118 similar in construction to the feeding and controlling drums of the form of the invention above described, and driven in substantially the same manner except in this instance the drums rotate in an opposite direction and the cables lead from the tops of the drums instead of the bottoms thereof. Wound on these drums are feeding and controlling cables 119 and 120. Arranged at the opposite sides of the cutter frame 112 are guide sheaves 121, 121 mounted on vertically swingable swing arms 122, while arranged on alined, transversely extending axes on the opposite sides of the motor frame and in advance of the cable drums are guide sheaves 123, 123. Arranged at the opposite rear corners of the feed frame are guide sheaves 124, 125, while mounted on horizontally swingable frames 126 are guide sheaves 127, 128. The cutter chain 116 is driven through usual driving gearing from the forward end of the motor power shaft, and is provided with a usual cutter chain controlling clutch, while the feeding and controlling drums are driven from the rear end of the motor power shaft. The feeding and controlling cables may be extended from the feeding and controlling drums around the guide sheaves 121, 123, 124, 125, 127, 128 in various manners and in any preferred direction, in a manner generally similar to that in the form of the invention above described.

Figure 10:
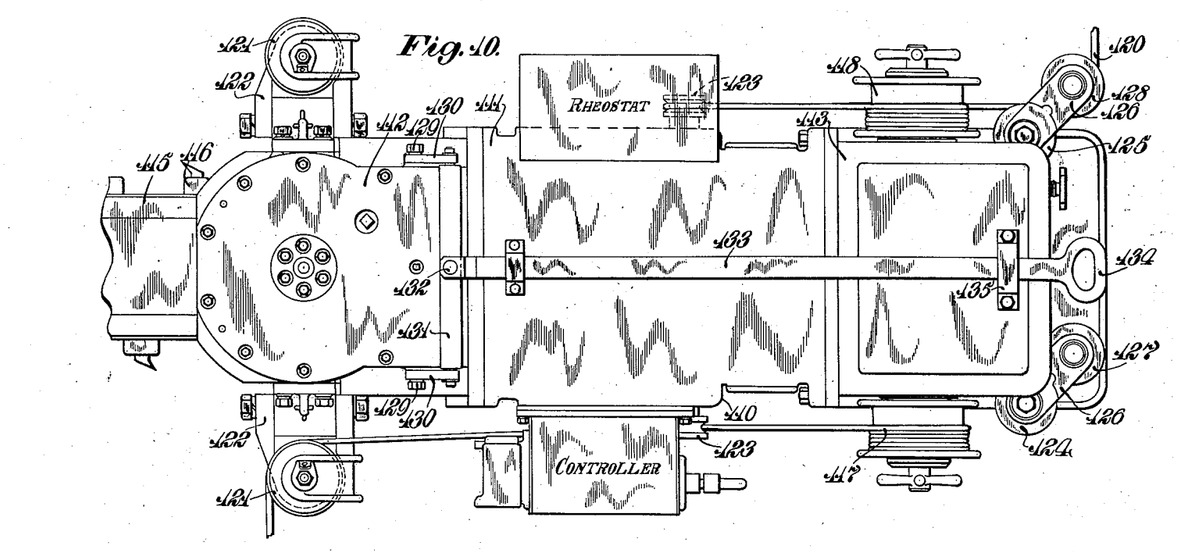
Fig. 10 is a plan view of another illustrative form of the invention.
Figure 11:
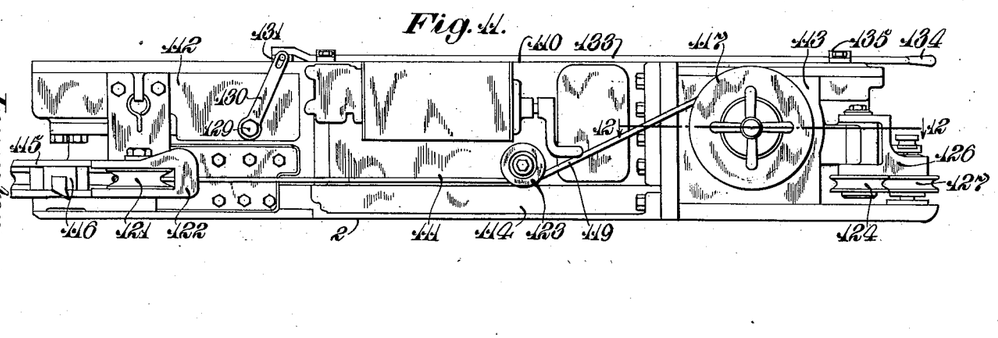
Fig. 11 is a side elevational view of the machine shown in Fig. 10.

In the particular construction shown herein, the cutter chain 116 is driven from the forward end of the motor power shaft through driving gearing generally similar to that described in my Patent No. 1,875,335, granted September 6, 1932. In the present instance, however, the cutter chain controlling clutch is operated by clutch shipper means connected to a transverse shaft 129 having fixed thereto at the opposite sides of the cutter frame, operating levers 130, 130. The upper ends of these levers are connected by a pin and slot connection to a transversely extending plate 131 overlying the cutter frame. Pivotally connected at 132 to this plate is an operating rod 133 extending rearwardly over the tops of the motor and feed frame sections and having at the rear end of the machine an operating handle 134. The operating rod 133 is slidably guided within guide members 135 secured to the top of the machine frame.

Figure 12:
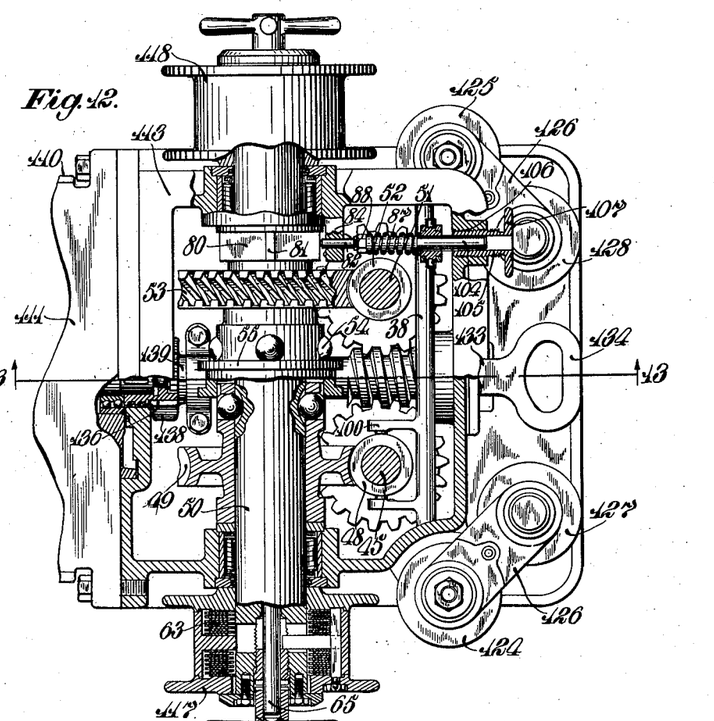
Fig. 12 is a horizontal sectional view, with parts shown in elevation, taken substantially on line 12—12 of Fig 11.
Figure 13:
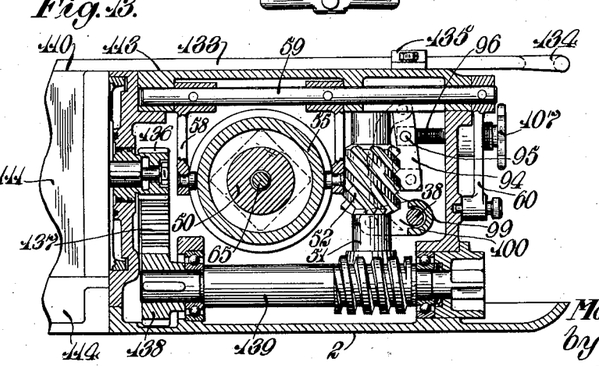
Fig. 13 is a longitudinally extending vertical sectional view taken substantially on line 13—13 of Fig. 12.
Figure 14:
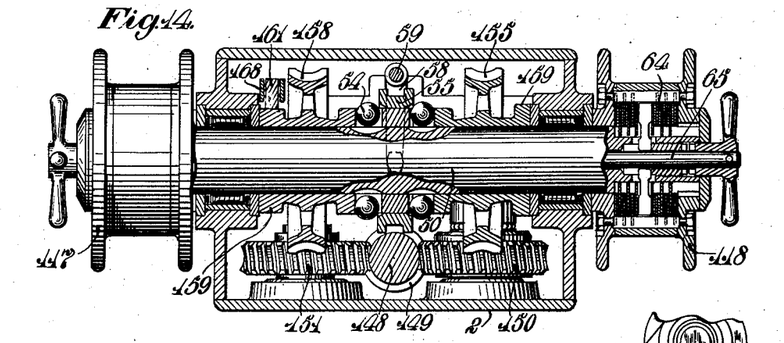
Fig. 14 is a view similar to Fig. 5, showing still another illustrative form of the invention, the view being taken substantially on line 14—14 of Fig. 16.

The driving means for the feeding and controlling drums 117, 118, as shown in Figs. 12 and 13, comprises a spur motor pinion 136 fixed to the rear end of the motor power shaft and meshing with an intermediate reach gear 137, which in turn meshes with a spur gear 138 fixed to a horizontal, longitudinally extending drive shaft 139, which herein corresponds to the drive shaft 23 of the form of the invention described above. However, in this instance, the shaft 139 rotates in a direction opposite from the shaft 23 due to the intermediate gear 137 which was not present in the form above described. The shaft 139 is in this instance arranged in planes adjacent the bottom of the feed frame, and is suitably journaled within the feed frame. The driving connections between the longitudinal shaft 139 and the feeding and controlling drums and the controlling means therefor and the means for driving the drums, are identical to those above described, and therefore a re-description of the same would be a needless repetition.

By arranging the driving motor between the cutter and feed frames and driving the feeding and cutting mechanisms from the opposite ends of the motor, the machine is rendered extremely vertically compact, and by the provision of the improved independent control and variable speed driving means for the feeding and controlling drums, the machine may be fed, even in extremely low coal, with great flexibility and comparative ease, it being possible to vary the feed to meet any cutting conditions encountered.

Figure 15:
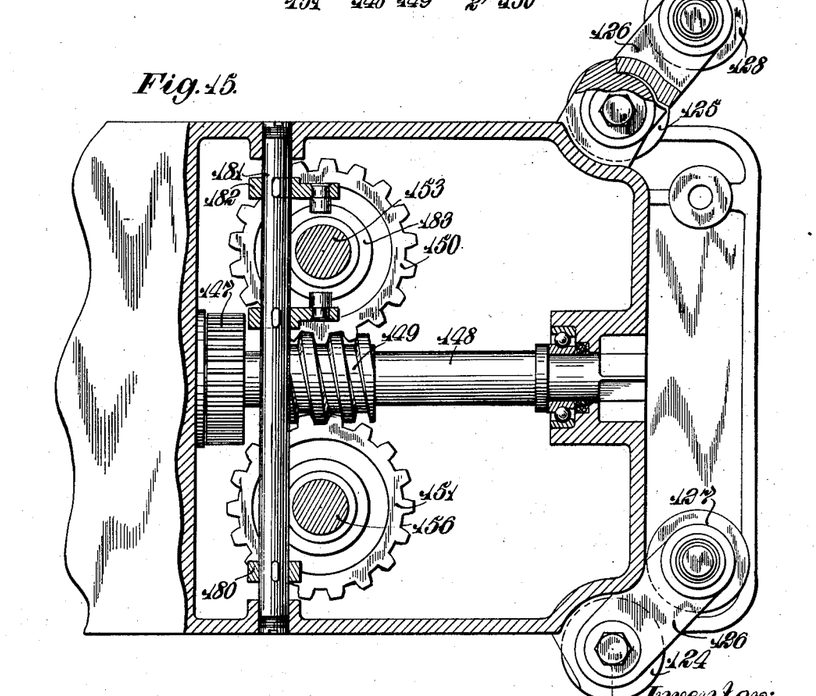
Fig. 15 is a horizontal sectional view taken substantially on line 15—15 of Fig. 16.
Figure 16:
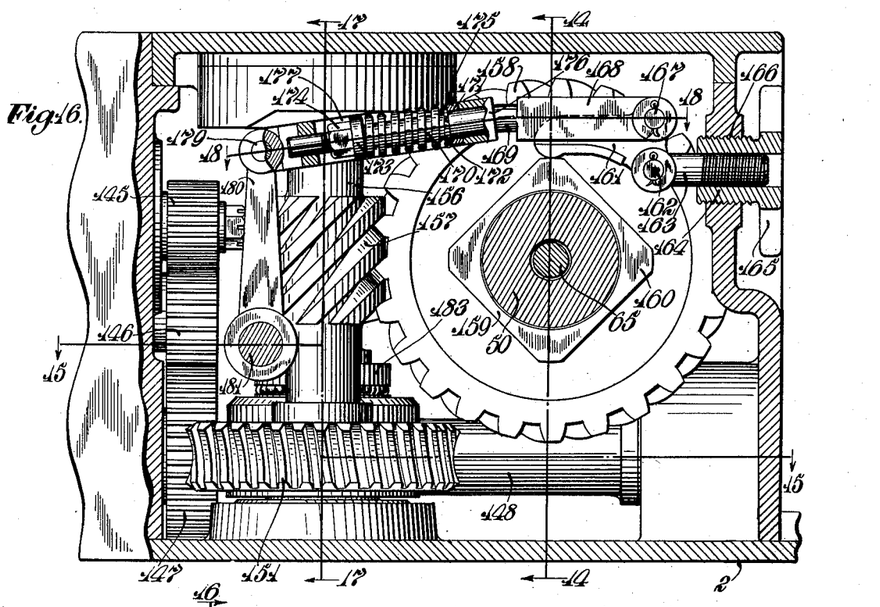
Fig. 16 is a longitudinally extending vertical sectional view taken substantially on line 16—16 of Fig. 17.
Figure 17:
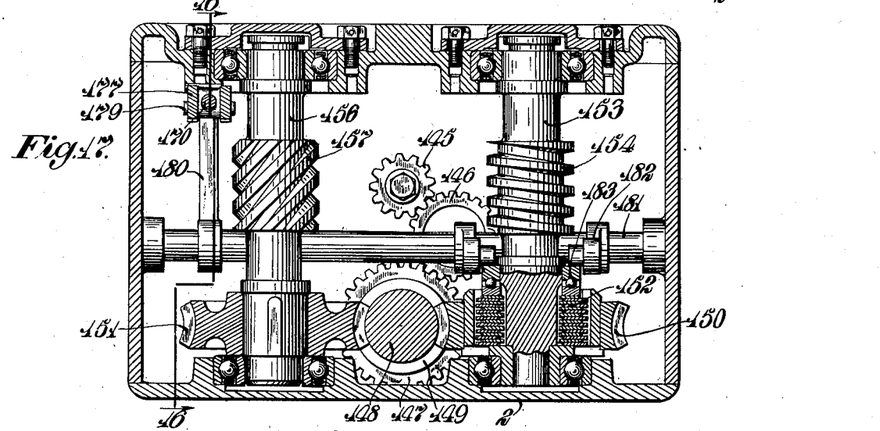
Fig. 17 is a transverse vertical sectional view taken substantially on line 17—17 of Fig. 16.
Figure 18:
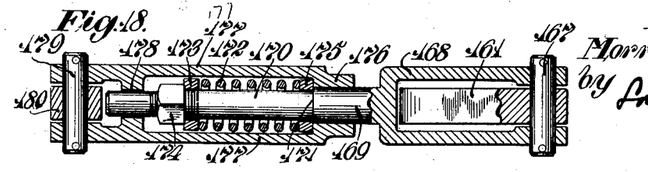
Fig. 18 is a detail sectional view taken substantially on line 18—18 of Fig. 16.

In Figs. 14 to 18, inclusive, the mining machine of the type disclosed in Figs. 10 to 13, inclusive, is shown provided with a modified form of feeding mechanism. In this form of the invention, fixed to the rear end of the motor power shaft is a spur motor pinion 145 (see Figs. 16 and 17) meshing with an intermediate spur gear 146, in turn meshing with a spur gear 147 fixed to the forward end of a horizontal longitudinally extending driving shaft 148. The shaft 148, as in the form of the invention shown in Figs. 10 to 13, inclusive, is arranged in horizontal planes adjacent the bottom of the feed frame and is likewise suitably journaled within the feed frame. Fixed to the drive shaft 148 adjacent the forward end thereof is a worm 149 meshing at its opposite sides with horizontal worm wheels 150 and 151. The hubs of the worm wheels 150, 151 are suitably journaled within bearings carried by the bottom of the feed frame, and the worm wheel 150 is connectible by a multiple disc clutch 152 to a vertical shaft 153 suitably journaled at its lower end within the worm wheel hub and at its upper end within the bearing carried by the top of the feed frame. Fixed to the shaft 153 is a slow speed worm 154 meshing with a slow speed worm wheel 155. The worm wheel 151 is fixed to a vertical shaft 156 suitably journaled within bearings carried by the top and bottom of the feed frame and having fixed thereto a fast speed worm 157 meshing with a fast speed worm wheel 158 arranged coaxially with the worm wheel 155. The transverse shaft structure, the interlocking clutch mechanism, and the drum controlling clutches, are identical to those described above in the other forms of the invention and as shown in Figs. 5 and 12, and therefore this structure will not again be described. In this form of the invention, the axes of the vertical shafts 153 and 156 lie in a transverse vertical plane in advance of the axes of the worm wheels 155 and 158. The improved variable speed driving means for the low speed worm gearing comprises a cam element 159 formed on the hub of the fast speed worm wheel 158 and having a plurality, herein four, of cam projections 160. Cooperating with the cam surfaces of this cam element is an operating lever 161 fulcrumed for pivotal movement at 162 on an operating rod 163, as shown in Fig. 16. The rod 163 is externally threaded for engagement with a nut 164 having an operating handle 165, this nut in turn threadedly connected at 166 within the rear end wall of the feed frame. The lever 161 is pivotally connected at 167 to a bifurcated element 168 having formed thereon a cylindrical portion 169 and a reduced, inwardly extending rod portion 170. The cylindrical portion 169 forms a shoulder 171, and a spring 172 encircling the rod portion 170 is compressed between a collar 173 abutting an adjusting nut 174 threadedly connected to the rod portion and a collar 175 slidably mounted on the rod portion and normally engaging the shoulder 171. Slidably mounted on the cylindrical portion 169 is a sleeve-like portion 176 of a member 177 having side arms straddling the spring 172 and having a transverse portion perforated by an opening 178 within which the inner end of the rod portion 170 extends in the manner shown in Fig. 18. The bifurcated inner end of the member 177 is pivotally connected at 179 to a lever 180 fixed to a rod 181 arranged transversely of the feed frame and rotatably mounted at its ends within the side walls of the feed frame, as shown in Fig. 15. Fixed to this rod 181 are clutch shipper elements 182 having projections engaging a ball bearing clutch applying member 183 for the clutch 152. It will thus be seen that when the parts are in the position shown in Fig. 16 and the cam element is rotating, the cam projections 160 engaging the outer extremity of the cam 161 effect swinging of the lever, thereby moving the rod portion 170 axially to the right, increasing the tension of the spring 172 and, through this spring, the collar 175 and sleeve portion 176 of the element 177, moving the element 177 to the right, thereby swinging the lever 180 to apply intermittently the disc clutch 152. By adjusting the handle 165, the position of the fulcrum 162 of the lever 161 may be changed to vary the time interval of application of the disc clutch. By moving the lever fulcrum into its extreme right-hand position in Fig. 16, the inner end of the lever 161 is at all times held against the surface of the cam element, thereby effecting constant application of the disc clutch 152, the spring 172 compressing as the cam projections 160 engage and swing the lever. By moving the lever fulcrum 162 to its extreme opposite position, the cam element may rotate while the disc clutch 152 is at all times released, the lever swinging back and forth as the cam projections engage the same without applying the clutch. It will thus be seen that the low speed worm gearing 154, 155 may be driven through the disc clutch 152 at any desired low feeding speed between zero and a predetermined low feeding maximum, the worm gearing being driven intermittently through a wide range of low speeds and continuously at a maximum low speed. It will also be evident that when the disc clutches within the drums are applied, and the high speed worm wheel 158 is connected to the drum drive shaft by the interlocking clutch device, the drums may be rotated in winding direction at a relatively high machine moving or haulage speed; while when the disc clutch 152 is applied and the low speed worm wheel 155 is connected to the drum shaft by the interlocking clutch device, the drums may be driven in winding direction at a relatively low feeding speed; and by varying the application of the disc clutch 152, the drums may be driven at any desired feeding speed between zero and the maximum low feeding speed. As in the forms of the invention above described, the drums may be simultaneously connected to the drum shaft, or one or the other may be released therefrom, as desired, it also being possible to release both drums from the shaft.

From the foregoing description, the mode of operation of the improved feeding mechanisms will be clearly apparent, and as the use of room-and-pillar coal mining machines of the types disclosed is well understood by those skilled in the art, a detail description of the mode of operation is considered unnecessary, other than to state that the cutter bar may be sumped beneath the coal by the use of the feeding and controlling cables and the machine fed transversely across the coal face by the feed cable, under the complete control of the operator through manipulation of the drum clutch and the variable speed control mechanism, the machine being guided during its transverse movement by means of the controlling cable under the control of the controlling drum clutch. In all forms of the invention, overloading will be prevented by the presence of the yieldable spring connection in the variable speed drive mechanism, and the feed drive may be interrupted at will merely by releasing the drum clutches or the variable speed friction.

As a result of this invention, it will be noted that an improved mining machine feeding mechanism is provided which is of a rugged and compact character and which is particularly adapted to use in the coal mining machines of the room-and-pillar or so-called shortwall type, wherein at times substantial variations in the feeding speed are of importance. It will further be noted that a continuous low feed and an intermittent low feed are both available by the same mechanism, permitting a single machine either a continuous feed or a variable speed, thereby to suit varying mining conditions. Further advantages will be apparent to those skilled in the art.

While in this application there are described three forms which the invention may assume in practice, it will be understood that these forms are shown for illustrative purposes only and that the invention may be further modified and embodied in various other forms without departing from its spirit or the scope of the appended claims.

What I claim as new and desire to secure by Letters Patent is:

1. In a mining machine transmission mechanism, a driven element, and motor operated driving means for said driven element for driving the latter through a wide range of low speeds between zero and a predetermined maximum low speed including a rotatable cam, a plunger actuated thereby and arranged with its axis at right angles to the cam axis, a pivoted lever, a yielding connection between said plunger and lever, said lever actuated by said plunger through said yielding connection, a lever actuated by said first named lever, a drive clutch, and controlling means for said clutch including clutch operating means actuated by said last named lever.

2. In a mining machine transmission mechanism, a driven element, and motor operated driving means for said driven element for driving the latter through a wide range of low speeds between zero and a predetermined maximum low speed including a rotatable cam, a plunger actuated by said cam and arranged with its axis at right angles to the cam axis, a coil spring encircling said plunger and engaging an abutment thereon, a collar on said plunger, a lever actuated by said plunger through said spring and collar, a drive clutch, and an operating lever for said clutch actuated by said first named lever.

3. In a mining machine transmission mechanism, a driven element, and motor operated driving means for said driven element for driving the latter through a wide range of low speeds between zero and a predetermined maximum low speed including a rotatable cam, a horizontal plunger actuated by said cam, a lever swingable in a vertical plane, a yielding connection between said plunger and said lever at one side of the lever pivot, said lever actuated by said plunger through said yielding connection, a second lever pivotally connected to said first lever at the opposite side thereof from the lever pivot, a drive clutch, and operating means for said clutch actuated by said last named lever.

4. In a mining machine transmission mechanism, a driven element, and motor operated driving means for said driven element including a motor power shaft, a parallel shaft driven thereby, a shaft extending transversely of the machine, parallel vertical shafts driven by said second mentioned shaft and each having a driving gear therefor coaxial therewith, which gear has its own drive, not including the other, from said second mentioned shaft, fast and slow speed gearings between said vertical shafts respectively and said transverse shaft and driven by the former, said slow speed gearing including a controlling clutch, and means actuated by an element of said driving means for intermittently applying and releasing said clutch.

5. In a mining machine transmission mechanism, a driven element, and motor operated driving mechanism for said driven element including a motor power shaft, a parallel shaft driven thereby, a shaft extending transversely of the machine, parallel vertical shafts driven by said second mentioned shaft and each having a driving gear therefor coaxial therewith, which gear has its own drive, not including the other, from said second mentioned shaft, fast and slow speed gearings between said vertical shafts respectively and said transverse shaft and driven by the former, said slow speed gearing including a friction controlling clutch, and means actuated by an element of said fast speed gearing for intermittently applying and releasing said clutch to obtain an intermittent slow speed drive.

6. In a mining machine transmission mechanism, a driven element, and motor operated driving means for said driven element including a drive shaft extending longitudinally of the machine, a worm driven thereby, worm wheels rotating on parallel vertical axes and driven by said worm, a shaft coaxial with one worm wheel and connectible thereto, a shaft coaxial with said other worm wheel and driven thereby, low speed gearing driven by said first named vertical shaft, high speed gearing driven by said second named vertical shaft, said worm wheel coaxial therewith being connectible to said first named vertical shaft by means of a friction clutch, and means actuated by said longitudinal drive shaft for intermittently applying and releasing said friction clutch.

7. In a mining machine transmission mechanism, a driven element, and motor operated driving means for said driven element including a drive shaft extending longitudinally of the machine, a worm driven thereby, worm wheels rotating on parallel vertical axes and driven by said worm, a shaft coaxial with one worm wheel and connectible thereto, a shaft coaxial with said other worm wheel and driven thereby, low speed gearing driven by said first named vertical shaft, high speed gearing driven by said second named vertical shaft, said worm wheel coaxial therewith being connectible to said first named vertical shaft by means of a friction clutch, and means actuated by an element of said high speed gearing for intermittently applying and releasing said friction clutch.

8. In a mining machine transmission mechanism, a driven element and motor operated driving means for said driven element including a drive shaft, a worm driven thereby, worm wheels rotating on parallel axes and driven by said worm, a shaft coaxial with one worm wheel, a friction clutch for connecting said shaft to its coaxial worm wheel, a shaft coaxial with said other worm wheel and driven thereby, low speed gearing driven by said first named one of said parallel shafts, and high speed gearing driven by said second named parallel shaft, and means driven by said drive shaft for automatically intermittently applying and releasing said friction clutch at timed intervals to effect intermittent drive of said low speed gearing.

9. In a mining machine transmission mechanism, a driven element, and motor operated driving means for said driven element including a drive shaft extending longitudinally of the machine, a worm driven thereby, worm wheels rotating on parallel vertical axes at opposite sides of the longitudinal vertical center of the machine and driven by said worm, a shaft coaxial with one worm wheel, a friction clutch for connecting said vertical shaft to its coaxial worm wheel, and a shaft coaxial with said other worm wheel and driven thereby, low speed gearing driven by said first named vertical shaft, high speed gearing driven by said second named vertical shaft, and means driven by said longitudinal drive shaft for automatically intermittently applying and releasing said clutch at timed intervals for effecting intermittent drive of said low speed gearing.

10. In a mining machine transmission mechanism, a transmission shaft extending longitudinally of the machine, a gear driven thereby, parallel vertical shafts, gears meshing with said gear for driving said vertical shafts respectively, said vertical shafts being arranged coaxially with said last mentioned gears, high and low speed gearings driven by said parallel shafts respectively, a drive control clutch coaxial with the vertical low speed gearing drive shaft for connecting the latter to its driving gear, and means actuated by an element of the high speed driving gearing for automatically intermittently applying and releasing said clutch.

11. In a mining machine transmission mechanism, a longitudinal transmission shaft, a worm fixed to said shaft and rotated thereby, worm wheels rotating about parallel vertical axes at opposite sides of said longitudinal shaft and driven by said worm, parallel vertical shafts driven by said worm wheels, respectively, high and low speed gearings driven by said vertical shafts, respectively, a clutch for connecting said vertical low speed gearing drive shaft to its driving worm wheel, and means actuated by an element of said high speed gearing for automatically intermittently applying and releasing said clutch at timed intervals.

12. In a mining machine transmission mechanism, a transmission shaft extending longitudinally of the machine, a gear driven by said shaft, parallel vertical shafts, gears meshing with said gear for driving said parallel vertical shafts respectively, said vertical shafts being arranged coaxial with said last mentioned gears, high and low speed gearings driven by said parallel vertical shafts respectively, a drive control clutch coaxial with the vertical low speed gearing drive shaft for connecting the latter to its driving gear, and means actuated by an element of the high speed driving gearing for automatically intermittently applying and releasing said clutch, said automatic clutch applying and releasing means including a cam driven by said vertical high speed gearing drive shaft.

13. In a mining machine transmission mechanism, a longitudinal transmission shaft, a worm fixed to said shaft and rotated thereby, worm wheels rotating about parallel vertical axes at opposite sides of said longitudinal shaft and driven by said worm, parallel vertical shafts driven by said worm wheels respectively, high and low speed gearings driven by said vertical shafts respectively, a clutch for connecting said vertical low speed gearing drive shaft to its driving worm wheel, and means actuated by an element of said high speed gearing for automatically intermittently applying and releasing said clutch at timed intervals, said automatic clutch applying and releasing means including a cam driven by said vertical high speed gearing drive shaft.

14. In a mining machine transmission mechanism, a longitudinal transmission shaft, a worm fixed to said shaft and rotated thereby, worm wheels rotating about parallel vertical axes at opposite sides of said longitudinal shaft and driven by said worm, parallel vertical shafts driven by said worm wheels respectively, high and low speed gearings driven by said vertical shafts respectively, a clutch for connecting said vertical low speed gearing drive shaft to its driving worm wheel, means actuated by an element of said high speed gearing for automatically intermittently applying and releasing said clutch at timed intervals, said automatic clutch applying and releasing means including a cam driven by said vertical high speed gearing drive shaft, a clutch shipper member for said clutch, an element actuated by said cam, and a transversely extending shaft for connecting said latter element to said clutch shipper member.

15. In a mining machine transmission mechanism, a driven element, and motor operated driving mechanism for said driven element for driving the latter through a wide range of low speeds between zero and a predetermined maximum low speed including a rotatable cam, a plunger actuated thereby and arranged with its axis at right angles to the cam axis, a pivoted lever having a sliding pivotal connection with said plunger, a yielding connection between said plunger and said lever, said lever actuated by said plunger through said yielding connection, a lever actuated by said first named lever, a drive clutch, and controlling means for said clutch including clutch operating means actuated by said last named lever.

16. In a mining machine transmission mechanism, a driven element, and motor operated driving mechanism for said driven element for driving the latter through a wide range of low speeds between zero and a predetermined maximum low speed including a rotatable cam, a plunger actuated by said cam and arranged with its axis at right angles to the cam axis, a spring encircling said plunger and engaging an abutment thereon, a collar on said plunger, a lever having a sliding pivotal connection with said plunger and actuated by said plunger through said spring and collar, a drive clutch, and an operating lever for said clutch actuated by said first named lever.

17. In a mining machine transmission mechanism, a driven element, and motor operated driving mechanism for said driven element for driving the latter through a wide range of low speeds between zero and a predetermined maximum low speed including a rotatable cam, a horizontal plunger actuated by said cam, a lever swingable in a vertical plane and having a sliding pivotal connection with said plunger, a yielding connection between said plunger and said lever at one side of the lever pivot, said lever actuated by said plunger through said yielding connection, a second lever pivotally connected to said first lever at the opposite side thereof from the lever pivot, a drive clutch, and operating means for said clutch actuated by said last named lever.

18. In a mining machine transmission mechanism, a driven element, and motor operated driving means for said driven element including a drive shaft, a gear driven thereby, gears rotating on parallel axes and each directly driven by said gear, a shaft coaxial with one of said last mentioned gears and connectible thereto, a clutch for connecting said second shaft to its coaxial gear, a shaft coaxial with said other of said last mentioned gears and driven thereby, low speed gearing driven by said first named parallel shaft, high speed gearing driven by said second named parallel shaft, and means driven by said drive shaft for automatically intermittently applying and releasing said clutch at timed intervals for effecting intermittent drive of said low speed gearing.

19. In a mining machine transmission mechanism, a driven element, and motor operated driving means for said driven element for driving the latter through a wide range of speeds between zero and a predetermined maximum low speed including a drive clutch, a lever movable in opposite directions to render said clutch operative and inoperative respectively, and means for actuating said lever with varied motion to vary the time of clutch operation including a rotatable cam, a plunger actuated thereby and arranged with its axis at right angles to the cam axis, and operating connections between said plunger and said lever including a yielding connection through which said lever is actuated and adjustable motion transmitting means actuated through said yielding connection for variably actuating said lever.

20. In a mining machine transmission mechanism, a driven element, and motor operated driving means for said driven element for driving the latter through a wide range of low speeds between zero and a predetermined maximum low speed including a drive clutch, a lever movable in opposite directions to render said clutch operative and inoperative respectively, and means for actuating said lever with varied motion to vary the time of clutch operation including a rotatable cam, a plunger actuated by said cam and arranged with its axis at right angles to the cam axis, and operating connections between said plunger and said lever including a yielding connection through which said lever is actuated, said yielding connection including a coil spring encircling said plunger and engaging an abutment thereon and a collar on said plunger, said lever actuated by said plunger through said spring and collar, and adjustable motion transmitting means actuated through said yielding connection for variably actuating said lever.

MORRIS P. HOLMES.